United States Patent
Dent et al.

(10) Patent No.: US 7,079,515 B1
(45) Date of Patent: Jul. 18, 2006

(54) SIGNAL DECODING WITH AND WITHOUT SECOND SYNCHRONIZATION WORD IN A MOBILE COMMUNICATION SYSTEM

(75) Inventors: Paul W. Dent, Pittsboro, NC (US); Krister Raith, San Diego, CA (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/700,284

(22) PCT Filed: May 13, 1999

(86) PCT No.: PCT/US99/10603

§ 371 (c)(1),
(2), (4) Date: Nov. 13, 2000

(87) PCT Pub. No.: WO99/60737

PCT Pub. Date: Nov. 25, 1999

Related U.S. Application Data

(60) Provisional application No. 60/085,710, filed on May 15, 1998.

(51) Int. Cl.
*H04B 7/212* (2006.01)

(52) U.S. Cl. .................................... 370/337; 370/347
(58) Field of Classification Search .................... None
See application file for complete search history.

(56) References Cited

U.S. PATENT DOCUMENTS

| | | | | |
|---|---|---|---|---|
| 5,230,082 A | * | 7/1993 | Ghisler et al. | 455/438 |
| 5,497,504 A | * | 3/1996 | Acampora et al. | 455/436 |
| 5,828,844 A | * | 10/1998 | Civanlar et al. | 709/228 |
| 6,088,335 A | * | 7/2000 | I et al. | 370/252 |

\* cited by examiner

*Primary Examiner*—Chau Nguyen
*Assistant Examiner*—Cynthia L. Davis
(74) *Attorney, Agent, or Firm*—Moore & Van Allen, PLLC; Gregory A. Stephens

(57) ABSTRACT

A time division multiple access (TDMA) radio communication system (100) accommodates signal decoding by a mobile station (130) with and without a second synchronization word (214). The radio communication system includes at least one base station (102, 104) to transmit radio signals during a succession of time slots (202, 204, 206) including a current time slot (202) and a subsequent time slot (204). The radio signals include an indication of whether transmission of the subsequent time slot is guaranteed. The system further includes at least one mobile station to receive the radio signals in accordance with the indication.

10 Claims, 4 Drawing Sheets

SIGNAL DECODING WITH AND WITHOUT SECOND SYNCHRONIZATION WORD IN A MOBILE COMMUNICATION SYSTEM

RELATED APPLICATIONS

This non-provisional application claims priority of provisional application Ser. No. 60/085,710, filed May 15, 1998, in the name of Paul W. Dent and Krister Raith.

BACKGROUND OF THE INVENTION

The present invention relates generally to transmitting and receiving signals in a mobile radio communication system. In particular the present invention relates to decoding signals in a mobile radio communication system which provides for suspending transmission from a base station of the system during selected time periods.

In time division multiple access (TDMA) radio communication systems, each transmitter in the system is assigned or allocated a time slot for transmitting radio signals. All other transmitters are quiet during this time slot so that the intended receiver can clearly receive the radio signals. If the radio communication system is a two-way mobile system, such as a cellular radio telephone system, a radio carrier frequency in a first frequency band is divided into time slots for communicating from a base station to a plurality of mobile stations, while a radio carrier frequency in a second frequency band is divided into time slots for communicating from different ones of the plurality of mobile stations to the base station. The base station communicates with mobile stations in a fixed geographic area near the base station. Other adjacent base stations serve mobile stations in adjacent areas.

During some of its time slots, the base station transmits control and timing information. This information includes, for example, the identity of a mobile station for which a received call is intended, on a paging channel, and synchronization and timing information on a synchronization or sync channel. A mobile station in the system receives the synchronization channel and synchronizes its timing with base station timing using information in the synchronization channel. Usually, each time slot also includes a known pattern of data to facilitate the mobile station estimating the channel phase and amplitude which is useful for decoding the symbols transmitted in the slot.

It is known to use a synchronization word at the beginning of the current time slot as well as the sync word at the beginning of the next slot and at the end of the current slot to improve the reception and decoding of symbols. Because of a fade or other interference on the channel, the current or first synchronization word may not be reliably received. By storing the received signal samples including the second synchronization word, the stored signal samples may be decoded using either the first or second synchronization word or both. This technique is described in U.S. Pat. No. 5,335,250, issued on Aug. 2, 1994, to Dent, et al., and in U.S. Pat. No. 5,841,816, issued on Nov. 24, 1998, to Dent, et al. Both of these patents are commonly assigned with the present patent application and are incorporated herein by reference. Some mobile stations are presently in use which rely on reception of the second synchronization word for optimal performance.

In some mobile radio systems, it is proposed to suspend or alter transmission of information including synchronization words when a time slot is unallocated. If the time slot is unallocated, no mobile station is presently using that time slot. The could result in the phase, amplitude or direction of transmission by the base station changing in the subsequent time slot with respect to the current time slot which would, without using the invention, degrade the operation of the existing mobile stations. The transmission of information by the base station in an unallocated time slot is however desired to be avoided to reduce interference for receivers in surrounding areas. Elimination of the transmission of the synchronization word and other information during unallocated time slots will reduce or eliminate this co-channel interference improving overall performance in the radio system. This improvement is threatened by the degradation due to removing the mobile station's ability to use the second synchronization word.

For a mobile station which relies on reception of the second synchronization word for improved communication, elimination of the synchronization word or a change in a characteristic such as timing, phase or direction of transmission in unallocated time slots will create a problem if the unallocated time slot follows the time slot allocated to that mobile station. The mobile station may not be able to successfully decode the channel or may spend undue time searching for the second synchronization word. Accordingly, there is a need for method and apparatus for accommodating the elimination of transmission of some slots by base stations in a mobile radio communication system without degrading performance of remaining slots.

DETAILED DESCRIPTION OF THE PRESENTLY PREFERRED EMBODIMENTS

Figure 1:
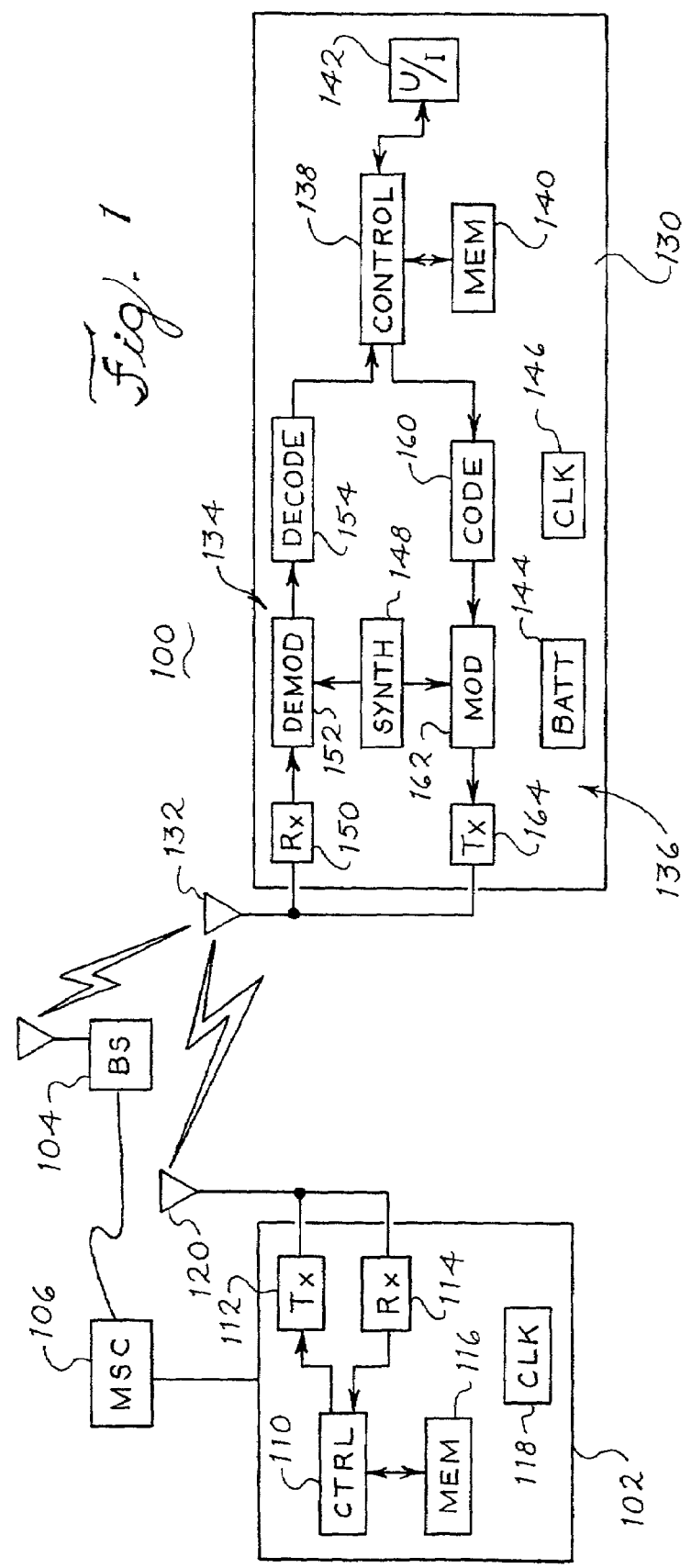
FIG. 1 is a block diagram of a radio communication system.

Referring now to the drawing, FIG. 1 shows a radio communication system 100 including at least one base station 102, 104 and at least one mobile station 130. The radio communication system 100 may be any two-way radio communication system, such as a cellular radiotelephone system, a personal communication system (PCS), a trunked radio system, or other. In the illustrated embodiment, the radio communication system 100 is a cellular radiotelephone system operated according to interim standard IS-136 as published by the Telecommunication Industry Association/Electronic Industry Association (TIA/EIA).

In FIG. 1, the system 100 is illustrated with two base stations, including base station 102 and base station 104. In general, all base stations are configured similarly and base station structure and operation will be described in conjunction with base station 102. The base stations of the system including base station 102 and base station 104 are linked together to form a network. The network is controlled by a mobile switching center (MSC) 106. The MSC 106 is connected by landline, telephone link or wireless link to each of the base stations 102, 104. The MSC 106 controls overall network operation, provides connection to the public switched telephone network (PSTN) and controls interoperation of the base stations to provide functions such as handover of radio communication between two base stations and a single mobile station in the system 100.

The base station 102 is exemplary of base station structure and operation. The base station 102 includes a controller 110, a transmitter 112, a receiver 114, a memory 116, a clock 118 and an antenna 120. The controller 110 controls overall operation of the base station 102. Each base station provides two-way radio communication with one or mobile stations in a fixed geographic region near the base station. The geographic region may be divided into sectors, each sector served by an antenna or a portion of the antenna 120.

The transmitter 112 transmits radio signals using the antenna 120 to mobile stations such as mobile station 130 within a fixed geographic area surrounding the base station 102. The transmitter 112 may include functions such as encoding, interleaving and modulation. The receiver 114 converts radio signals received at the antenna 120 to digital data for use by the base station 102. The receiver may include functions such as filtering, demodulation and decoding. The memory 116 stores data and instructions for operating the controller 110 and for use by other circuitry within the mobile station 102.

The clock 118 provides a timebase for operating the base station 102. In general, equipment operating in the system 100 must be closely synchronized including the base stations, the MSC 106 and mobile stations. The clock 118 receives synchronizing signals from the MSC 106 and in turn is used to provide synchronizing signals to mobile stations such as mobile station 130.

It will be understood by those ordinarily skilled in the art that the base stations 102, 104 may include other functions and other circuitry as well. These functions include managing call initiation with a mobile station and hand over of communication with a mobile station from one base station to another base station.

The mobile station 130 is exemplary of mobile stations which may operate in the radio communication system 100. The mobile station may be any radio capable of two-way radio communication with a remote base station, such as a cellular telephone, PCS telephone or other two-way radio. In the illustrated embodiment, the mobile station 130 is a cellular telephone operable according to IS-136. The mobile station 130 in the illustrated embodiment includes an antenna 132, a receive path 134, a transmit path 136, a controller 138, a memory 140, a user interface 142, a battery 144, a clock 146 and a synthesizer 148.

The receive path 134 receives radio signals detected at the antenna 132 and produces digital data for use within the mobile station 130. The receive path 134 includes an analog front end 150, a demodulator 152 and a decoder 154. The analog front end 150 includes a low noise amplifier and suitable filters for detecting and filtering the radio signals received at the antenna 132. The analog front end 150 may further include circuitry, such as a mixer coupled to the synthesizer 148, for shifting the frequency at which the radio signals are broadcast down to a lower frequency for more convenient processing in the mobile station 130. The demodulator 152 processes received signal samples by using the synchronization word or known symbol pattern to determine estimates of the multipath propagation channel and then uses the channel estimates to process signal samples to produce soft-decisions, compensated for multipath, and inter-symbol interference. The soft-decisions are then fed from demodulator 152 to decoder 154 which performs error correction coding to produce error-corrected information to controller 138.

The transmit path 136 converts digital data produced by the controller 138 to radio signals for transmission using the antenna 132. The transmission path 136 includes an encoder 160, a modulator 162 and a transmitter 164. The encoder 160 encodes the digital data provided by the controller 138 into a format required for communication in the system 100 including interleaving. The encoded data is provided to the modulator 162 which uses the data to modulate a carrier signal provided by the synthesizer 148. The modulated carrier is provided to the transmitter 164, which provides functions such as power amplification and filtering. The amplified carrier is then applied to the antenna 132 for transmission to a remote base station such as base stations 102, 104.

The controller 138 controls overall functioning of the mobile station 130. The controller 138 is preferably implemented as a microcontroller, a digital signal processor or a microprocessor or a combination of these, and operates in response to data and instructions stored in the memory 140. The user interface 142 allows control of the mobile station by a user and typically includes a keypad, a microphone, a speaker and a display. The battery 144 provides operational power for the mobile station 130. The clock 146 provides timing for circuitry of the mobile station 130. In particular, the clock 146 provides timing signals for use by the controller 138 so that the mobile station 130 including the controller 138 may remain synchronized with the rest of the communication system 100.

In the illustrated embodiment, the radio communication system 100 is a time division multiple access (TDMA) radio communication system. That is, in the system 100, each mobile transmitter in the system, when active, is assigned or allocated a time slot for transmitting radio signals. All other mobile transmitters in the same cell using the same frequency are quiet during this time slot so that the intended receiver can clearly receive the radio signals on that channel. Of course, in another cell or on another frequency, other mobiles may independently be using the same time slot.

One example of a TDMA radio communication system is a cellular telephone system according to interim standard IS-136. IS-136 defines a communications frame having six time slots which however are normally allocated in pairs to form a full-rate channel. The full-rate channel is thus really a three-slot TDMA system. By combining a slot on an uplink frequency with a slot on a downlink frequency, a duplex channel is created for two-way communication between the base station and a particular mobile station.

Figure 2:
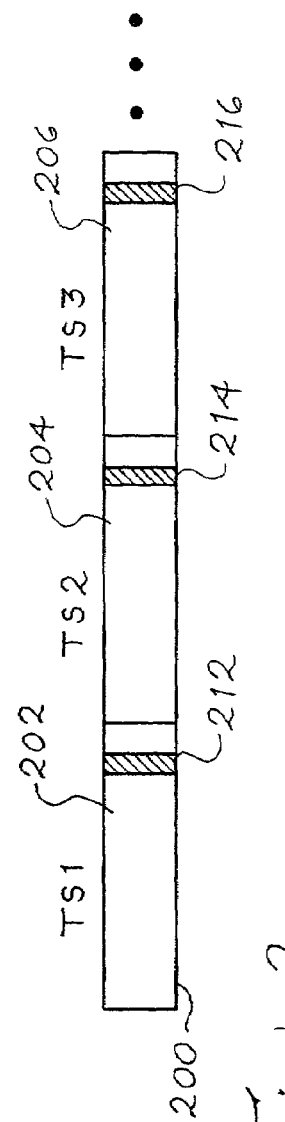
FIG. 2 is a diagram illustrating communication format in the radio communication system of FIG. 1.

FIG. 2 illustrates communication format in the radio communication system of FIG. 1. FIG. 2 illustrates a portion of a communications frame 200 including three time slots, a first time slot 202, a second time slot 204 and a third time slot 206. The time slots 202, 204, 206 are all transmitted by a base station in the system 100 of FIG. 1.

Each time slot includes a synchronization word. Thus, the first time slot 202 includes a synchronization word 212, the second time slot 204 includes a synchronization word 214 and the third time slot 206 includes a synchronization word 216. The synchronization word or sync word comprises a predetermined data pattern in a predetermined location near the beginning of each time slot. The synchronization word is used by a receiving mobile station for synchronizing timing and decoding the transmitted time slot.

Each time slot and its associated synchronization word is intended by the transmitting base station for reception by a single mobile station in the vicinity of the base station. However, in the current IS-136 system, all three time slots are always transmitted, so that the intended mobile station can receive other time slots such as subsequent time slots as well as or even better than its intended time slot. In IS-136, the transmission format exhibits time-reversal symmetry, so that a mobile station may demodulate its information from the first sync word forward or from the second sync word backward. However, in a future system, a time slot may be omitted when there is no data to send, reducing interference to the unintended receiver, but depriving an intended receiver of the second synchronization word.

It is known to use the synchronization word of the current time slot and of a subsequent time slot to improve the reception and decoding symbols by a mobile station. This technique is described in U.S. Pat. No. 5,335,250, issued on Aug. 2, 1994, to Dent et al., and in U.S. Pat. No. 5,841,816, issued on Nov. 24, 1998, to Dent et al. Both of these patents are commonly assigned with the present patent application and are incorporated herein by reference. The decoding technique of these incorporated references or other suitable decoding technique is referred to herein as a first decoding algorithm or technique. In accordance with the presently disclosed embodiments, in situations where the base station cannot guarantee transmission of a synchronization word in the subsequent time slot, the mobile station will use a second decoding algorithm or technique.

According to the decoding and demodulation techniques described in the incorporated references, a mobile station receives an assigned or allocated time slot of a TDMA frame period. Using a first decoding algorithm, the mobile station decodes the received signals with the aid of known symbols called the first synchronization word that are transmitted near the beginning of the allocated time slot and with the aid of known symbols transmitted near the beginning of a subsequent time slot referred to herein as the second synchronization word. Stated alternatively, the base station transmits first predetermined data symbols and unknown data symbols. The synchronization word or other known data pattern form the first predetermined data symbols. The specific data intended for the particular mobile station are unknown data symbols. The unknown data symbols may be encoded speech data, control data or other data. In some systems, the base station transmits second predetermined data symbols, such as a second synchronization word in the subsequent time slot.

In some systems, the known symbols at the beginning of the subsequent time slot, for example, the second synchronization word, are not guaranteed to be transmitted by the base station. This may be done, for example, to reduce co-channel interference for receivers in surrounding areas. If the subsequent time slot is not allocated to a mobile station of the base station, the base station may suspend transmission during the unallocated time slot, including the synchronization word, to reduce co-channel interference. Alternatively, the base station may use a directional antenna which permits broadcast of a time slot into one particular sector of the area served by the base station. This sector may be different from the sector where the mobile station allocated to the current time slot is located. Thus, the second time slot may not be received coherently with preceding slot data due to the change of beam direction.

Because of these possibilities, the base station cannot guarantee transmission of the second predetermined data symbols, such as the synchronization word in the subsequent time slot. Further, the transmission of the second predetermined data symbols, if it occurs, may not be useful if the timing or phase or amplitude of the subsequent time slot is substantially varied by the base station for any particular reason. Because the synchronization word is used by the mobile station for synchronizing its timing and reception to the base station, any change in these parameters may cause a loss of synchronization and require re-synchronization of the mobile station to the base station.

When the known symbols, such as the synchronization word, at the beginning of the subsequent time slot are not guaranteed to be transmitted by the base station, or are not guaranteed to be transmitted with timing, phase, amplitude or direction continuity with respect to the transmission in the current time slot, the base station according to the invention provides a signal to the mobile station indicating that the second synchronization word cannot be relied upon. Stated alternatively, the base station transmits an indication when transmission of the second predetermined data symbols is not guaranteed.

A mobile station decodes transmissions from the base station using at least the first predetermined data symbols. If the signal transmitted by the base station indicates that the transmission of the second predetermined data symbols or second synchronization word is reliable, the mobile station will use the first predetermined data symbols, the second predetermined data symbols or both to decode the time slot received from the base station according to the incorporated disclosure of a "first" algorithm. Any suitable algorithm described in the incorporated references or otherwise may be used.

When the mobile station receives the indication that the second predetermined data symbols or second synchronization word cannot be relied upon, the mobile station decodes signals received in a selected time slot using a second decoding algorithm. The second decoding algorithm requires only known symbols transmitted in the selected time slot. This second decoding algorithm may be any of the variations described in the above-incorporated references that are invoked by setting the quality of the second synchronization word permanently to the lowest quality value as long as the indication that the second synchronization word may not be relied upon is maintained. Any other suitable decoding algorithm may also be used that makes use only of the one guaranteed synchronization word.

Thus the mobile station decodes the unknown data symbols using the first predetermined data symbols when the indication is transmitted, and decodes the unknown data symbols using the first predetermined data symbols and the second predetermined data symbols when no indication is transmitted. The indication may be any suitable data or signal contained within control signaling information transmitted by the base station to the mobile station. In one embodiment, the indication is transmitted during call setup or during handover. Call setup occurs when two-way communication is being initiated between the mobile station and the base station. Call initiation occurs when the mobile station has indicated that a user desires to make an outgoing call or when the base station has signaled an incoming call to the mobile station on a paging channel. Handover occurs when a mobile station moves from the area of coverage of a first base station to the area of coverage of a second base station. During both these occurrences, substantial control information is exchanged between the mobile station and the base station.

In one embodiment, the base station broadcasts an indication to all mobile stations in its covered region or in a sector of its covered region. This may be accomplished using the broadcast control channel (BCCH) known as the digital control channel or DCC. The indication informs mobile stations that the base station is using a mode of operation that does not guarantee the usability of the second synchronization word. In response, all mobile stations in the sector or coverage area then use the second decoding algorithm.

In another embodiment, a mobile station provides an indicator to the base station that the mobile station requires the second synchronization word for optimum decoding of time slot information from the base station. This is suitable for compatibility with mobile stations that have this requirement. According to this embodiment, the mobile station transmits an indicator, the indicator indicating that the mobile station requires transmission of the second predetermined data symbols. In response to the indicator, the base station according to the invention reliably transmits the second predetermined data symbols even when no data is transmitted in the following slot. The base station does not suspend transmission of second synchronization word and does not vary the transmission phase or amplitude or any other necessary characteristic, but may omit transmission of data following the second word, if no data need to be sent.

The indicator may comprise a predetermined data pattern or an operational mode indicator for the mobile station. The indicator may be transmitted with control information provided by the mobile station to the base station.

Alternatively, the indicator may be contained in standard information transmitted by the mobile station to the base station. For example, each mobile station has a protocol version number which is transmitted to the base station at the initiation of communication between the two. A protocol version number refers to the revision of the standard, such as IS-136, which the mobile station is using. In response to the protocol version number or any other similar indicator, the base station can decide if the mobile station expects the second synchronization word or can be reliably operated without transmission of the second synchronization word. Further, one of these two operational modes may be set as a default with the nondefault condition only being selected upon a suitable determination by the base station. Still further, in yet another embodiment, the base station may decide which mode to operate in by using an identifier such as the electronic serial number (ESN) of the mobile station transmitted by the mobile station during call setup. By comparing the ESN for the mobile station with values stored in memory at the base station or elsewhere on the communications network, the base station can retrieve characteristics of that mobile station from a subscriber database, including which operational mode to provide for the mobile station. Thus, the base station determines transmission requirements for the mobile station and transmits the predetermined second data symbols in response to the transmission requirements for the mobile station.

Figure 3:
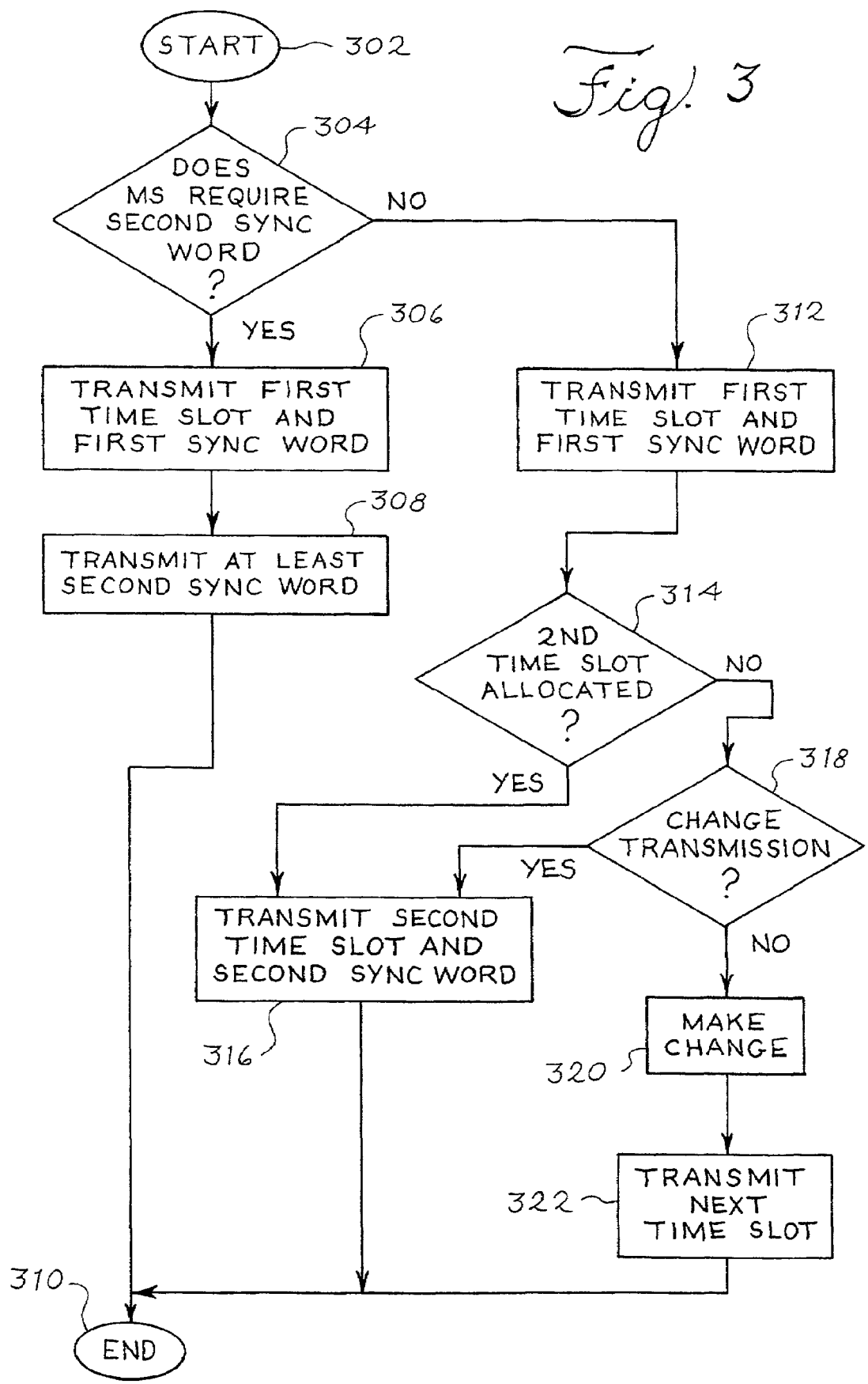
FIG. 3 is a flow diagram illustrating a method for operating a base station in the radio communication system of FIG. 1.

FIG. 3 is a flow diagram illustrating a method for operating a base station in the radio communications system 100 of FIG. 1. The method begins at step 302. At step 304, the base station determines if the mobile station (MS) requires a second synchronization word. This determination may be made according to any suitable method, such as by receiving signaling information from the mobile station containing an implicit indicator that the mobile station requires the second synchronization word, or by receiving an identifier or other information from the mobile station and comparing the identifier with stored data to determine the mobile station's transmission requirements. In the embodiment illustrated in FIG. 1, the controller 110 of the base station 102 forms a first means for determining a type of a particular mobile station in radio communication with the base station. Further, the controller 110 forms a second means (110) for determining a type of another mobile station in radio communication with the base station. The controller 110 may operate in conjunction with the memory 116 for this purpose, or may operate in conjunction with other data processing equipment of the system, such as the MSC 106.

If the base station determines that the mobile station requires the second synchronization word, at step 306 the base station transmits a first time slot including a first synchronization word. At step 308 the base station then transmits at least the second synchronization word. In this manner, both the first predetermined data symbols (the first synchronization word) and the second predetermined data symbols (the second synchronization word) are provided to the mobile station for accurate demodulation and decoding of the unknown data symbols transmitted in the first time slot by the base station. In the embodiment of FIG. 1, the transmitter 112, alone or in conjunction with the controller 110, forms a means responsive to the type of the particular mobile station for transmitting radio signals to the particular mobile station during a current time slot and during at least a part of a subsequent time slot when the particular mobile station is of a first type. The method then ends at step 310.

If at step 304 the base station determined that the mobile station does not require the second synchronization word, at step 312 the base station transmits the first time slot and the first synchronization word. With regard to the embodiment of FIG. 1, the transmitter 112, alone or in conjunction with the controller 110, forms a means responsive to the type of the particular mobile station for transmitting radio signals to the particular mobile station during a current time slot and radio signals adapted to a type of another mobile station when the particular mobile station is of a second type. Subsequently, at step 314, the base station determines if the second time slot (i.e., the time slot immediately following the first time slot) has been allocated. The second time slot is allocated if the base station is in two-way radio communication with a second mobile station using the second time slot of the same radio channel. Transmission during the second or subsequent time slot may be suspended or varied if the base station does not communicate with any mobile station during that time slot, or if the mobile station allocated to that time slot is in a different direction. If the second time slot is allocated, at step 316 the base station will transmit the second time slot and the second synchronization word, which are required by the mobile station to which the second time slot is allocated.

If, at step 314, the base station determined that the second time slot is not allocated, at step 318, the base station determines if there is a need to change its radio transmission. Such a need will exist, for example, if the second time slot has been allocated to a mobile station located in a different sector of the geographic area serviced by the base station. If no change is required, control proceeds to step 316 and the second time slot and second synchronization word are transmitted. However, if a change is required, at step 320, the base station makes the necessary change in transmission and, at step 322, transmits the next time slot. The method ends at step 310.

Figure 4:
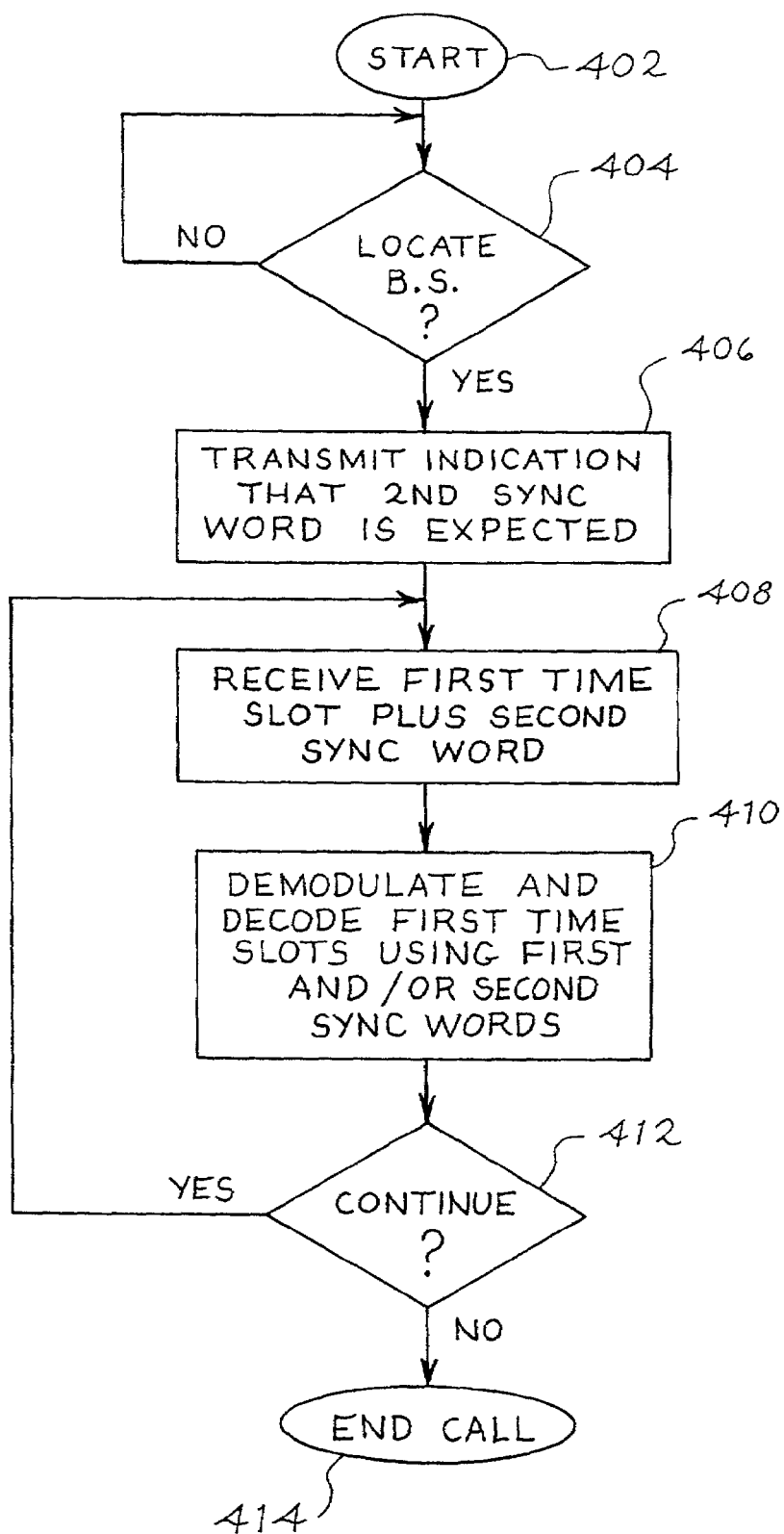
FIG. 4 is a flow diagram illustrating a method for operating a mobile station of a first type in the radio communication system of FIG. 1.

FIG. 4 is a flow diagram illustrating a method for operating a mobile station of a first type in the radio communication system of FIG. 1. The first type of mobile station requires or expects transmission of the second synchronization word by the base station. The method begins at step 402.

At step 404, the mobile station remains in a loop, attempting to locate a control transmission from the base station (BS). If no suitable transmission is located, the mobile station continues searching. The mobile station may be attempting to initiate a call by beginning two-way radio communication with the base station, or may be attempting to hand over communication from a first base station to a second base station to be located.

In the context of FIG. 1, the receive path 134 forms a means for receiving and decoding a signal from the remote base station. The analog front end 150, the demodulator 152 and the decoder 154 are adapted to perform these functions. The design and implementation of these circuits, including both hardware and software, as well as alternative embodiments, are described more fully in the incorporated references. The new indicator signal provided by the present invention indicates whether the base station transmissions are of the first type or second type. The first type of transmission includes symbols such as a synchronization word in a subsequent time slot which the mobile station 130 may use for decoding the base station transmission. The second type of base station transmission does not reliably include the second synchronization word. The decoder 154, in combination with the controller 138, form a means responsive to the indication for decoding communications signals received from the base station 102, 104 in an allocated time slot of a TDMA frame period. The decoder 154 and controller 138 may be suitably implemented as any combination of hardware or software for performing these functions.

In one embodiment, once a base station has been located, at step 406 the mobile station determines to inform the base station of its need for a second sync word for optimum performance. In other embodiments, no specific implementation of step 406 may occur. Rather, the software or other routine which controls the operation of the mobile station may simply perform the next step depending on the operational mode of the mobile station.

If the mobile station does require a second synchronization word, it may transmit an indicator at step 408. As described above, the indicator may be data or other information contained in signaling, such as control signals. The control signals may be, for example, the electronic serial number (ESN) or mobile identification number (MIN) uniquely associated with the mobile station. The indicator indicates the type of mobile station to the base station, which in turn determines if the mobile station requires transmission of second predetermined data symbols in a subsequent time slot to its allocated time slot. Alternatively, the indicator can be a specific class mark or protocol version number which is transmitted to the base station and is used by the base station to determine that the mobile station requires transmission of the second synchronization word. Still further, the mobile station may merely transmit identifying information, such as an identifier like its electronic serial number, which is in turn used by the base station to determine transmission requirements of the mobile station.

At step 408, the mobile station receives the first time slot transmitted by the base station and receives at least the second sync word. At step 410 the mobile station demodulates the first time slot with the aid of the second sync word. More generally, the mobile station demodulates and decodes the first time slot using any of the decoding techniques described above in the incorporated references or any other suitable technique. The mobile station determines at step 412 if more time slots are forthcoming or if the call has been terminated. If the call continues, control returns to step 408. If the call has been terminated, the method then ends at step 416.

Figure 5:
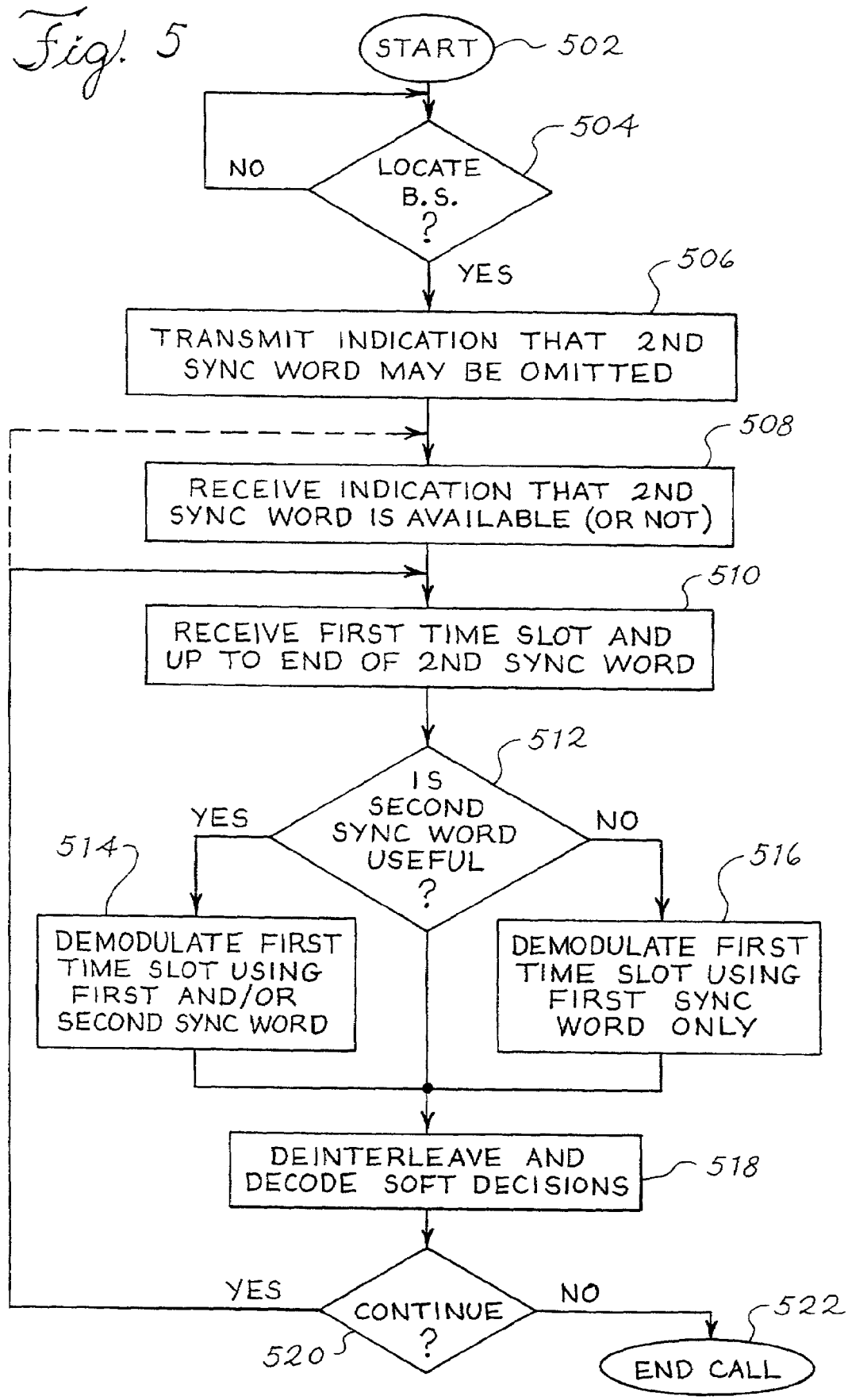
FIG. 5 is a flow diagram illustrating a method for operating a mobile station of a second type in the radio communication system of FIG. 1.

FIG. 5 is a flow diagram illustrating a method for operating a mobile station of a second type in the radio communication system of FIG. 1. The second type of mobile station does not require or expect transmission of the second synchronization word by the base station. However, in one embodiment, if the second sync word is available, the mobile station of the second type uses the second sync word to optimize its performance. The method begins at step 502. Step 504 proceeds like step 404, described above in conjunction with the mobile station of the first type. At step 506, the mobile station transmits an indicator that the second sync word may be omitted.

If the mobile station does not require a second synchronization word, at step 508 the mobile station of the second type may receive an indication from the base station as to whether the second synchronization word is available. At step 510, the mobile station receives the first time slot including up to the second sync word. At step 512, the mobile station checks whether the second sync word has been indicated to be available or useful. If so, the mobile station proceeds to step 514 and uses a first demodulation algorithm using the first and/or the second sync word. If not, the mobile station proceeds to step 516 and uses a second algorithm to demodulate the first time slot using the first sync word only. Then at step 518, soft decisions from successive first slots, whether demodulated using the first algorithm at step 514 or the second algorithm at step 516, are de-interleaved and decoded.

If, at step 520, the call should continue, a return is made to step 510 to receive the next first slot. Optionally, control returns to step 508 if a per-slot indication of the availability of the second sync word is provided. Otherwise, if the call has been terminated, the method ends at step 522.

From the foregoing, it can be seen that the illustrated embodiments provide a method and apparatus for accommodating the elimination or modification of transmission of some synchronization words by base stations in a mobile radio communication system. The base station communicates an indication to mobile stations in the region served by the base station that the transmission of subsequent synchronization words will be suspended or varied and are therefore not reliable. In an alternative embodiment, a mobile station may transmit an indicator to the base station that the mobile station requires the second synchronization word, in which case the base station will continue to transmit the second synchronization word for the use of the mobile station.

These embodiments allow the deployment of improved base stations which use more advanced directive antenna arrays that can transmit different time slots of a TDMA frame period in different directions, adapted to the position of the intended receiver. Alternatively, the embodiments permit the use of adaptive power control where the transmission power level in a time slot may be increased or decreased in dependence on the distance of the intended receiver. Both of these variations affect the characteristics of the second synchronization word. Using the illustrated embodiments, such advanced base stations can be adapted to revert to transmission of the second synchronization word with signal continuity to the previous time slot in order to remain retrospectively compatible with mobile station receivers that rely upon the second synchronization word.

While a particular embodiment of the present invention has been shown and described, modifications may be made. For example, while the synchronization word transmitted in each time slot has been shown for use by the mobile station for demodulating and decoding transmissions from a base station, any predetermined data or symbols contained in a time slot may be used by the mobile station. It is therefore intended in the appended claims to cover all such changes and modifications which follow in the true spirit and scope of the invention.

The invention claimed is:

1. A mobile station operable in a radio communication system (100) including one or more base stations transmitting during a succession of time slots (202, 304, 206), the mobile station comprising:
   a decoder configured to identify in transmissions from the one or more base stations an indication whether a subsequent time slot can be relied on for reception; and
   a demodulator for demodulating transmissions during a current time slot from the one or more base stations according to a one of a first algorithm and a second algorithm in accordance with the indication.

2. The mobile station of claim 1 wherein the decoder is configured to identify the indication in data received from the one or more base stations.

3. The mobile station of claim 2 wherein the decoder is configured to identify the indication in data received from the one or more base stations during initiation of two way communication between the mobile station and the one or more base stations.

4. The mobile station of claim 1 wherein the decoder is configured to identify the indication in the subsequent time slot.

5. The mobile station of claim 1 further comprising:
   a transmitter for transmitting signals to the remote base station; and
   a circuit configured to format data for communication to the remote base station, the data including an indicator which indicates to the base station whether the mobile station accepts transmissions of the first type.

6. A base station configured for operation in a radio communication system, the base station for transmitting signals to one or more mobile stations in a predetermined geographic region, the mobile stations being of one of a first type and a second type, the base station comprising:
   first means for determining a type of a particular mobile station in radio communication with the base station;
   second means for determining a type of another mobile station in radio communication with the base station; and
   means responsive to the type of the particular mobile station for transmitting
      (a) radio signals to the particular mobile station during a current time slot and during at least a part of a subsequent time slot when the particular mobile station is of the first type, and
      (b) radio signals to the particular mobile station during a current time slot and radio signals adapted to the type of the other mobile station when the particular mobile station is of a second type.

7. The base station of claim 6 wherein the first means for determining comprises a circuit configured to determine the type of the particular mobile station based on a transmission from the mobile station.

8. The base station of claim 6 wherein the means for transmitting adapts the radio signals according to one of changing a power level of transmission in the subsequent time slot, changing a phase of transmission in the subsequent time slot, changing timing of transmission in a subsequent time slot, changing direction of transmission in the subsequent time slot, changing modulation of transmission, and changing burst format of transmission in the subsequent time slot.

9. A time division multiple access (TDMA) radio communication system comprising:
   at least one base station to transmit radio signals during a succession of time slots including a current time slot and a subsequent time slot, the radio signals including an indication of whether transmission of the subsequent time slot is guaranteed; and
   at least one mobile station to receive the radio signals in accordance with the indication,
wherein the at least one mobile station comprises a circuit to decode the radio signals using information in the current time slot and information in the subsequent time slot when the indication indicates that the transmission of the subsequent time slot is guaranteed.

10. A base station configured for operation in a radio communication system, the base station for transmitting signals to one or more mobile stations in a predetermined geographic region, the mobile stations being of one of a first type and a second type, the base station comprising:
   first means for determining a type of a particular mobile station in radio communication with the base station;
   second means for determining a type of another mobile station in radio communication with the base station; and
   means responsive to the type of the particular mobile station for transmitting
      (a) radio signals to the particular mobile station during a current time slot and during at least part of a subsequent time slot when the particular mobile station is of the first type, and
      (b) radio signals to the particular mobile station during a current time slot and radio signals adapted to the type of the other mobile station when the particular mobile station is of a second type.

* * * * *